No. 815,882. PATENTED MAR. 20, 1906.
F. W. TUCKER.
VENDING MACHINE.
APPLICATION FILED JULY 1, 1903.

6 SHEETS—SHEET 4.

Witnesses:
J. G. Hachenberg.
Henry Thieme.

Inventor:
Frank W. Tucker
by attorneys

No. 815,882. PATENTED MAR. 20, 1906.
F. W. TUCKER.
VENDING MACHINE.
APPLICATION FILED JULY 1, 1903.

6 SHEETS—SHEET 5.

Witnesses:
F. G. Hachenberg.
Henry Theine.

Inventor:
Frank W. Tucker
by attorneys

No. 815,882. PATENTED MAR. 20, 1906.
F. W. TUCKER.
VENDING MACHINE.
APPLICATION FILED JULY 1, 1903.
6 SHEETS—SHEET 6.
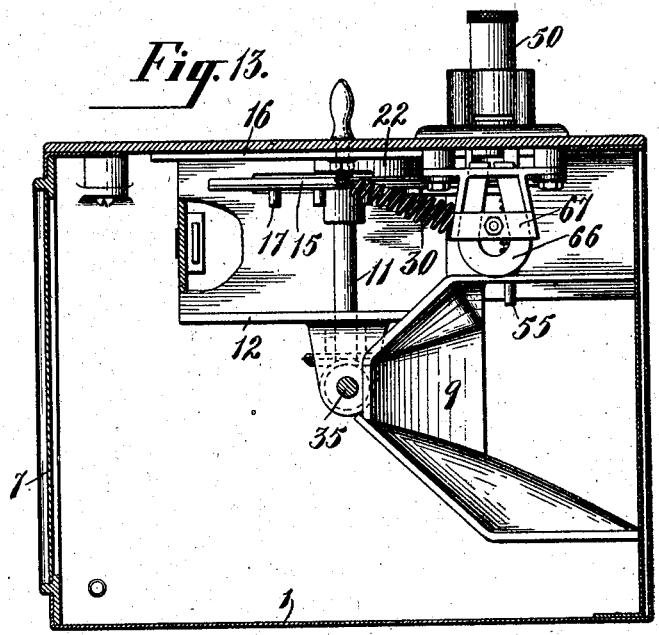
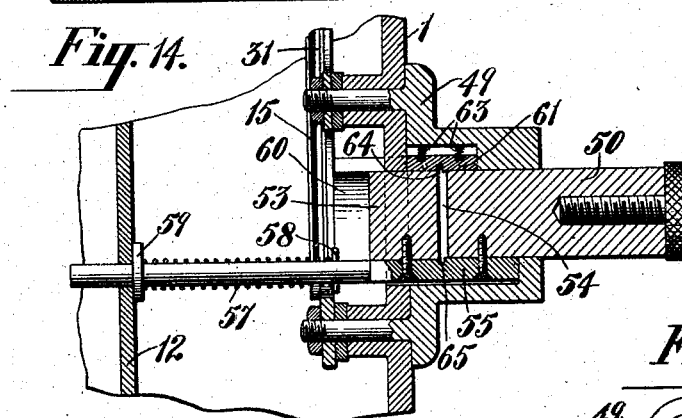
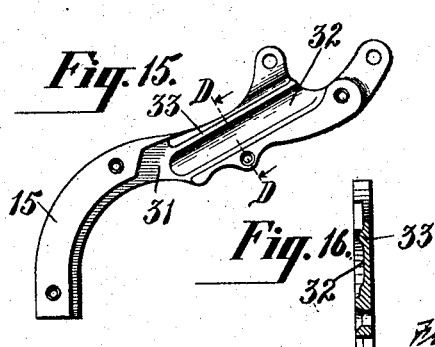
Witnesses:
Inventor:
Frank W. Tucker

UNITED STATES PATENT OFFICE.

FRANK W. TUCKER, OF MILFORD, CONNECTICUT.

VENDING-MACHINE.

No. 815,882.  Specification of Letters Patent.  Patented March 20, 1906.

Application filed July 1, 1903. Serial No. 163,898.

*To all whom it may concern:*

Be it known that I, FRANK W. TUCKER, a citizen of the United States, and a resident of Milford, in the county of New Haven and State of Connecticut, have invented a new and useful Vending-Machine, of which the following is a specification.

My invention relates, broadly, to vending-machines for delivering articles in bulk—such, for instance, as nuts in the shell.

My invention more particularly relates to certain improvements in the delivery mechanism and the coin-operated mechanism for controlling the delivery mechanism.

The object of my invention is to provide a machine capable of vending articles in bulk in predetermined quantities, the delivery mechanism being so arranged as to prevent the articles from being damaged while being delivered.

A further object is to provide certain improvements in the construction, form, and arrangement of the several parts, whereby the operation of the same is materially simplified.

A practical embodiment of my invention is represented in the accompanying drawings, in which—

Figure 1:
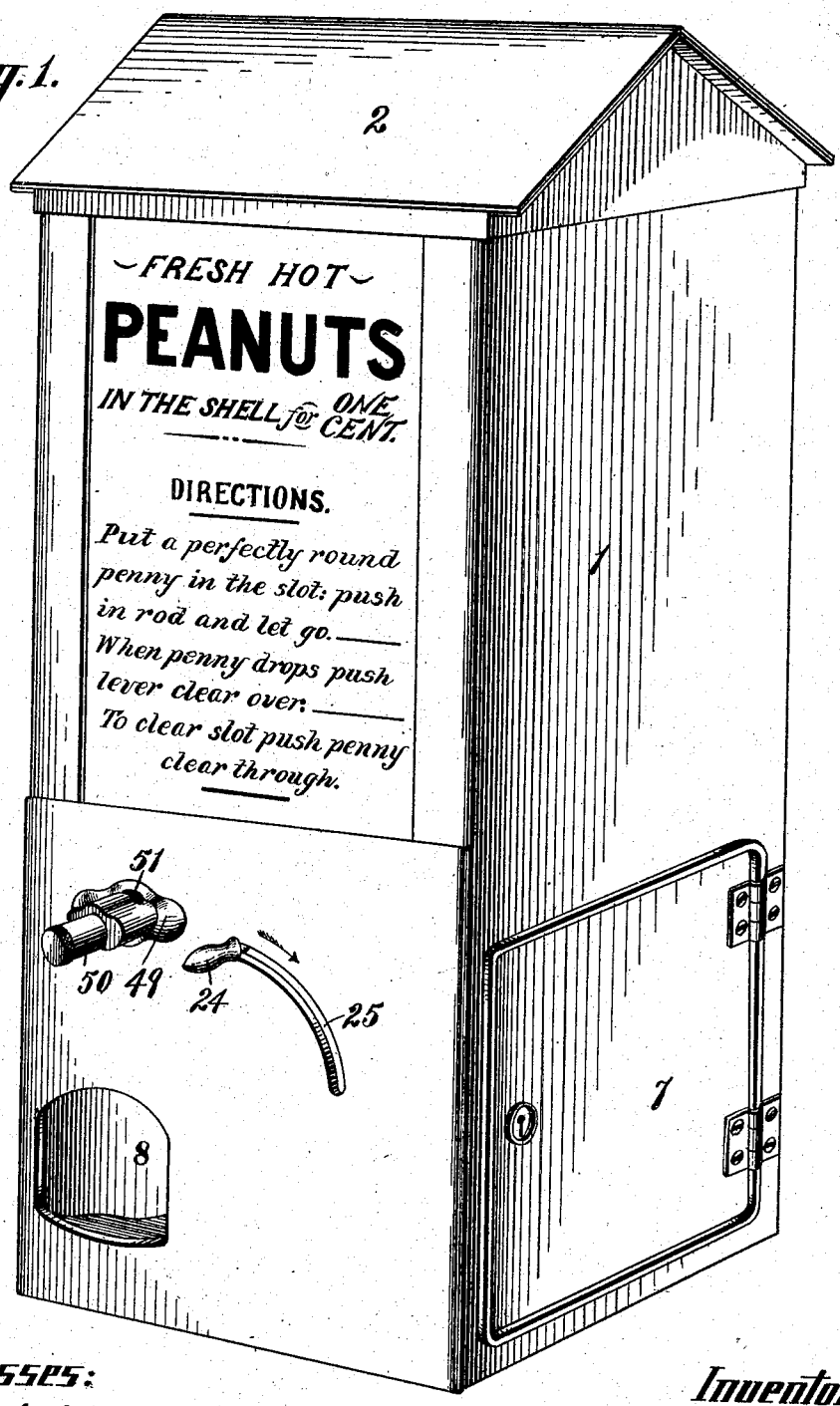
Figure 2:
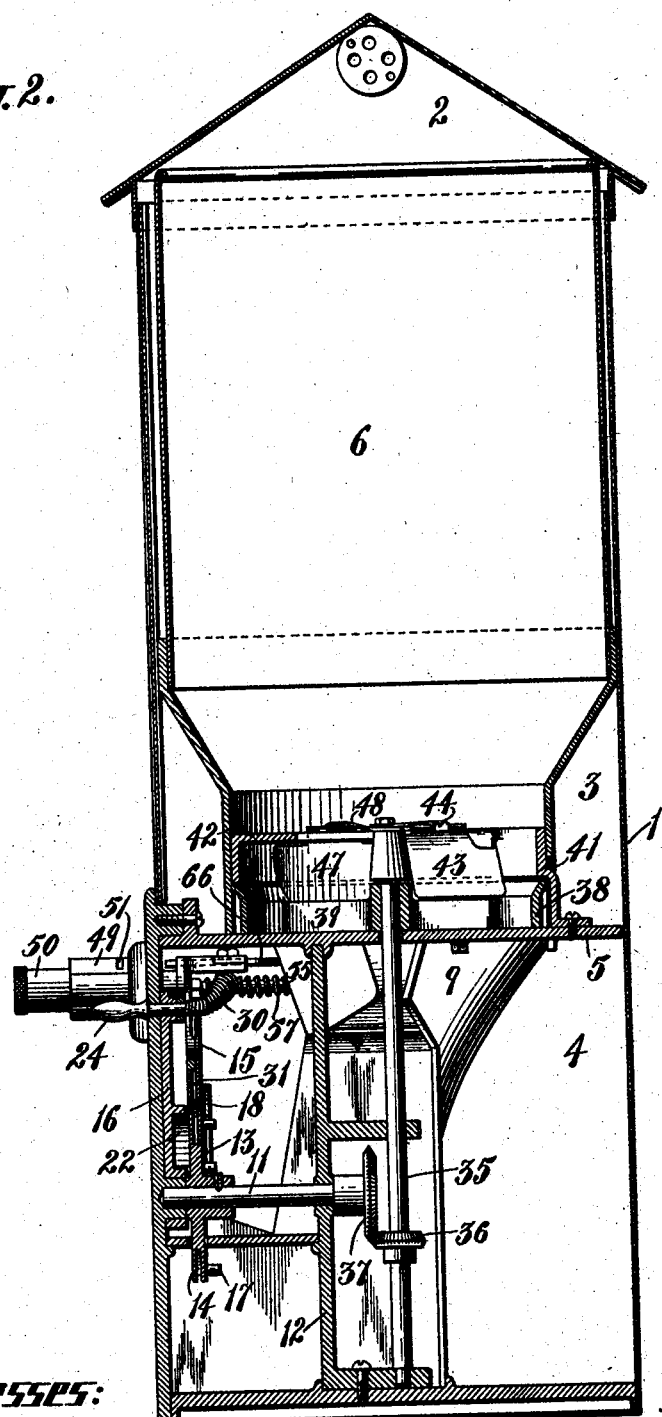
Figure 3:
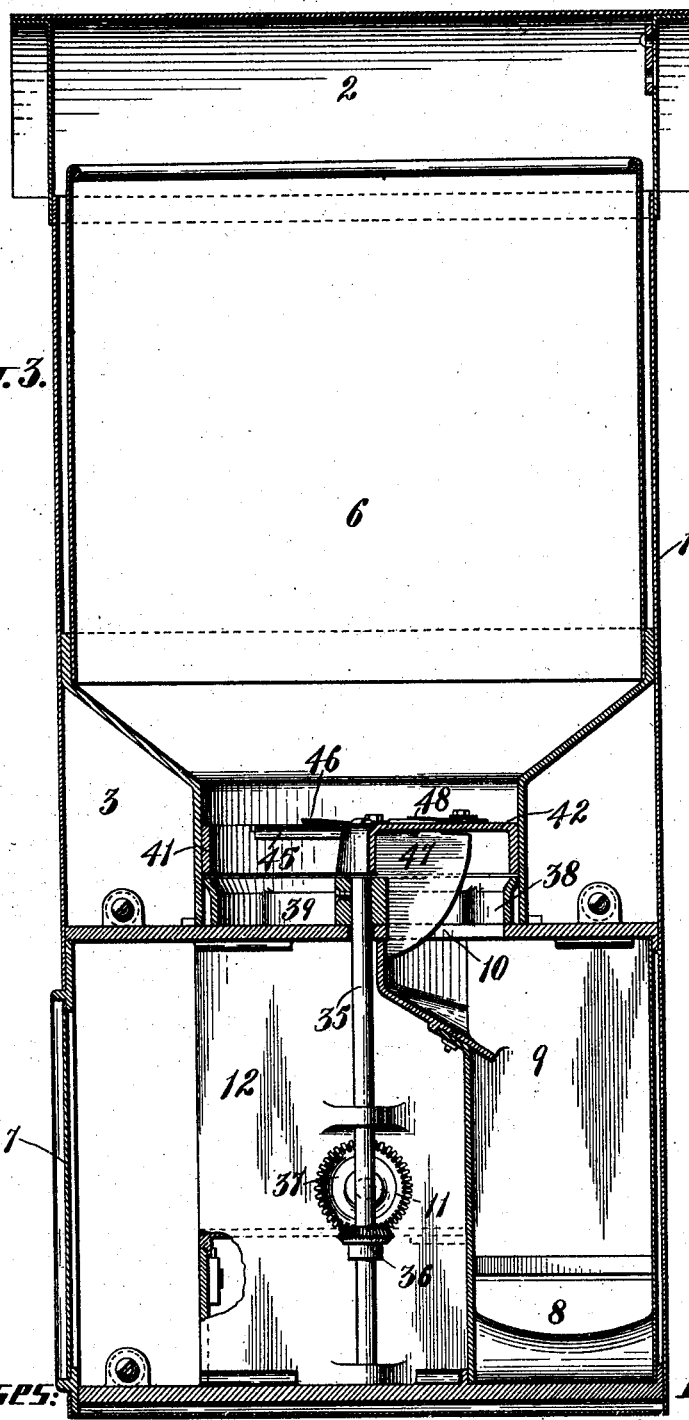
Figure 4:
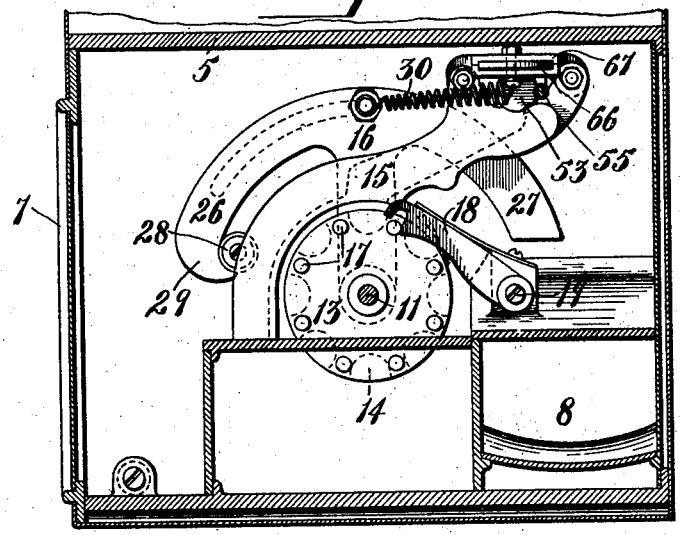
Figure 5:
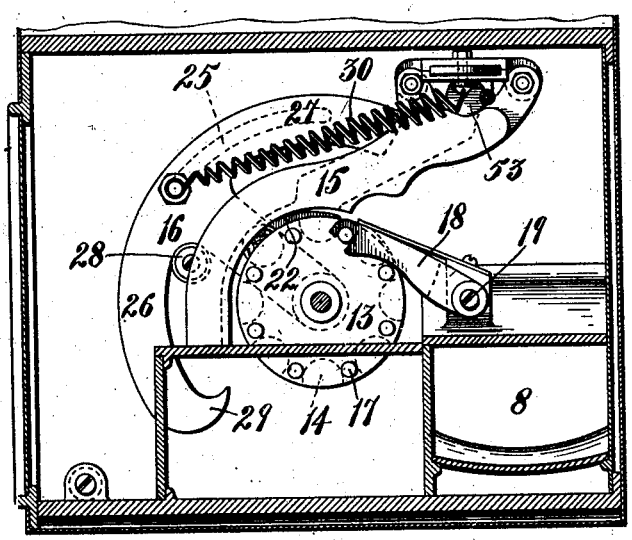
Figure 6:
Figure 7:
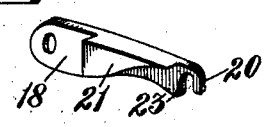
Figure 8:
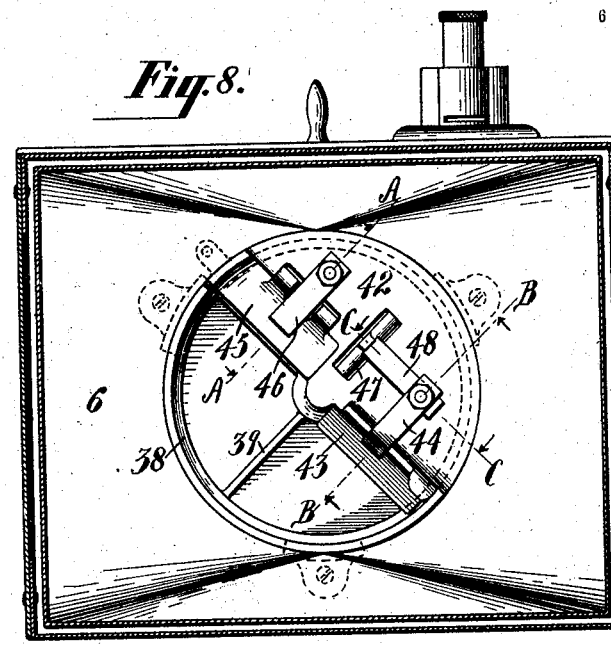
Figure 9:
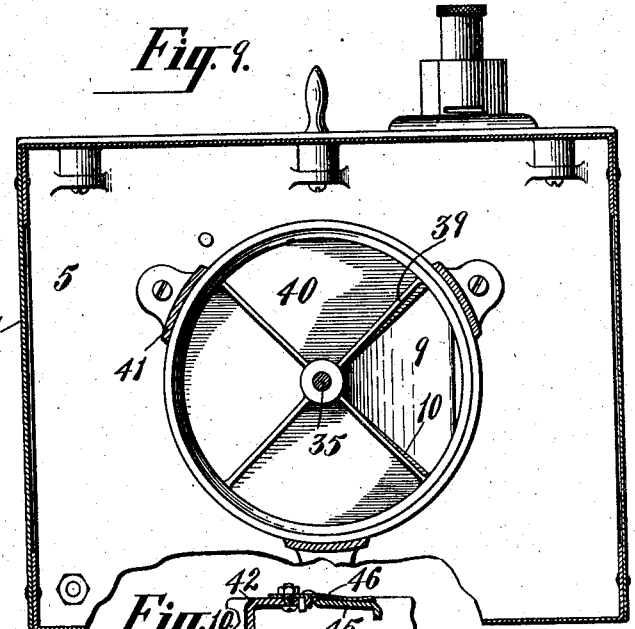
Figures 10, 11, 12:
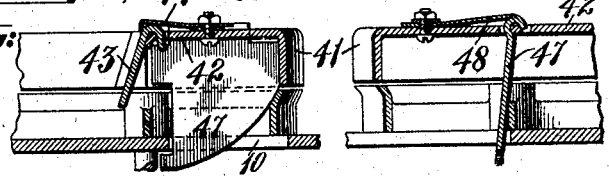

Figure 1 is a view in perspective of the vending-machine. Fig. 2 is a view in vertical section, taken from front to rear through the machine. Fig. 3 is a view in vertical section, taken from side to side through the machine. Fig. 4 is a partial vertical section taken from side to side through the machine looking toward the front of the machine with the coin-controlled mechanism in its normal position. Fig. 5 is a similar view showing the position which the parts assume when the coin-controlled lever is swung to the limit of its movement away from its normal position. Fig. 6 is a detail top plan view of the coin-controlled operating-lever. Fig. 7 is a detail perspective view of the dog for locking and releasing the coin-receiving wheel. Fig. 8 is a horizontal section through the machine above the mouth of the reservoir. Fig. 9 is a horizontal section through the machine in a plane showing the delivery-wheel in full lines. Fig. 10 is a detail sectional view in the plane of the line A A of Fig. 8. Fig. 11 is a detail sectional view in the plane of the line B B of Fig. 8. Fig. 12 is a detail sectional view in the plane of the line C C of Fig. 8. Fig. 13 is a horizontal section through the machine in position to show the coin-operated mechanism and article-delivery chute. Fig. 14 is an enlarged detail horizontal sectional view through the coin-receiving plunger and its adjacent parts. Fig. 15 is a detail face view of one half-section of the coin-chute. Fig. 16 is a transverse section through the same in the plane of the line D D of Fig. 15 looking in the direction of the arrows, and Fig. 17 is a cross-section through the plunger-receiving socket-piece taken in the plane of the coin receiving and ejecting slots.

The casing of the machine is denoted by 1, and it has a removable top or cover 2. The casing 1 is divided interiorly into an upper chamber 3 and lower chamber 4 by a horizontal partition 5. A reservoir 6 for the articles to be vended is located within the upper chamber 3. The casing is provided with a door 7 for gaining access to the lower chamber 4.

The article-delivery opening is denoted by 8, and an article-delivery chute 9 leads from an opening 10 in the horizontal partition 5 to the said delivery-opening 8.

The mechanism for positively delivering a predetermined portion of the articles in bulk from the reservoir 6 is constructed, arranged, and operated as follows: A horizontally-arranged shaft 11 is mounted in suitable bearings in the front of the casing and extends through a vertical partition 12, extending from the bottom of the casing to the horizontal partition 5. This shaft 11 is provided with a coin-receiving wheel 13, the periphery of the wheel being provided with a plurality of pockets 14, arranged to receive coins of the predetermined size successively therein as they drop from the coin-chute 15. These pockets 14 are of such depth that portions of the coins will project beyond the periphery of the wheel 13 to form abutments arranged to be engaged by the delivery-mechanism-operating lever 16. One face of the wheel 13 is provided with an annular series of pins 17, corresponding in number to the pockets 14, which pins are successively engaged by a spring-actuated dog 18, hinged at 19 within the casing. This dog is provided with a hook 20, arranged to engage the studs 17 for locking the wheel against rotary movement in either direction when so desired. This dog 18 is further provided along one face with a cam 21, arranged to be engaged by a curved shoe 22, carried by the lever 16, so that when the lever 16 is in its normal position the wheel may be permitted to be rotated in a forward direction. The back of the hook 20 is extended down to form a stop 23 for preventing the reverse movement of the wheel 13 at all times. The lever 16 is hinged concentric to the shaft 11 within the casing and is provided with an operating-handle 24, which projects through a curved slot 25 in the front of the casing. The lever 16 is provided with wings 26 27, which serve to close the slot 25 irrespective of the position of the lever. A cushion-stop 28 is provided within the casing, which stop is arranged to be engaged by the lever for limiting its forward movement and by a hook 29, projecting inwardly from the wing 26 when the lever is in its normal position at the limit of its reverse movement. A graduated retracting-spring 30 serves to yieldingly hold the lever 16 in its normal position and to return the lever to its normal position when rocked forwardly out of the same.

The coin-chute 15 comprises two half-sections permanently secured together. The slot 31 in the chute is open upwardly through the upper half of the chute and downwardly through the lower half of the chute. The lower half of the chute is curved around the periphery of the coin-receiving wheel 13 and is spaced a short distance therefrom, so as to retain the outer portions of the coins within the slot 31, while their inner portions are located within the pockets 14, until the wheel has been turned a sufficient number of steps to deliver the coins into the bottom of the casing. To prevent the coins from sticking within the chute before they have reached the wheel, the opposite walls of the slot 31 are cut away, as shown at 32, leaving a narrow guiding-rib 33 along each side of the coin, thus reducing the frictional engagement of the coin with the side walls of the chute.

The curved shoe 22 of the lever 16, above referred to, extends into the space between the periphery of the wheel 13 and the lower edge of the coin-chute, and the said shoe is provided with an abrupt shoulder 34, arranged to engage the edge of the coin which presents itself in the said space, so that when the lever is rocked forwardly it will also rotate the wheel 13 a single step. As the lever is rocked forwardly the shoe 22 is disengaged from the cam 21 upon the rocking dog 18, and thus permits the dog to swing down into engagement with one of the pins 17 on the wheel to prevent further movement of the wheel until the lever has been swung back to its normal position ready to engage the next succeeding coin after it has been inserted into position. This curved shoe 22 also serves to cover the next succeeding pocket 14 in the wheel, so as to prevent another coin dropping from the chute 15 into the said pocket until the lever has been swung back into its normal position.

A vertical shaft 35 is mounted in suitable bearings within the casing, and it is provided with a beveled gear 36, which intermeshes with a beveled gear 37 on the horizontal shaft 11. The upper end of the vertical shaft 35 projects above the horizontal partition 5 and is there provided with a delivery-wheel 38, subdivided by partitions 39 into a plurality of open compartments 40. The wheel is so arranged that as it is rotated it will bring the bottoms of the open compartments 40 into alinement with the opening 10 through the horizontal partition 5, which communicates with the delivery-chute 9. The lower end of reservoir 6 is contracted and rests upon the horizontal partition 5 around the delivery-wheel 38. A cylindrical casing 41 is secured to the horizontal partition 5, which casing is located above the delivery-wheel 38 and is constructed to direct the articles into the compartments 40 of the delivery-wheel. A portion of the top of the casing 41 is inclosed, as shown at 42, so as to expose two only of the compartments 40 in the delivery-wheel to the interior of the reservoir. This casing 41 is provided with several devices for insuring the accurate delivery of the articles without bruising the same or cramping the mechanism, as follows: A yielding guard 43 is hinged to the top 42 of the casing 41 along one edge of the top from the center to the periphery thereof for preventing the articles from falling into the delivery-chute from the compartment in the wheel which is being filled by being in open communication with the reservoir. A spring 44 serves to hold the guard 43 yieldingly in position.

A spring-actuated dividing-plate 45 is hinged to the edge of the top 42 of the casing 41 upon the opposite side of its center from the guard 43, which plate yields upwardly against the pressure of a spring 46 to accurately divide the articles as the wheel 38 rotates beneath the same. This yielding dividing-plate prevents the articles being vended from crushing by being cramped between the closed top of the casing 41 and the partitions 39 of the wheel.

An article-retaining plate 47 depends from the top 42 of the casing 41 between the guard 43 and dividing-plate 45 adjacent to the opening 10 through the partition 5 along one edge of the same for retaining the articles to be vended within their compartment 40 after it has passed beneath the dividing-plate and before it has been brought into alinement with the said opening 10 for delivery. A spring 48 serves to yieldingly retain the plate 47 in its position and at the same time permits the plate to yield to permit the partitions 39 of the wheel passing beneath the same.

By providing the devices hereinabove described in connection with the casing 41 I am enabled to insure an accurate delivery of the articles into the chute without liability of injuring the articles.

The coin-receiving mechanism and the means for bringing it into position to drop into the coin-chute is constructed, arranged, and operated as follows: A socket-piece 49 is secured to the front of the casing and a plunger 50 is fitted to slide therein. The socket-piece 49 has a coin-receiving slot 51 through its top wall and a discharge-slot 52 in its bottom wall in line with the slot 51 for the discharge of coins of other values and slugs. The plunger comprises an outer section 50 and an inner section 53, which sections are held the predetermined distance apart to form a coin-receiving space 54 by means of a bar 55, secured to the sections 50 53 of the plunger and fitted to slide in a squared recess 56 in the inner wall of the socket-piece 49. This bar 55 extends rearwardly into the interior of the casing and is guided at its inner end in the vertical partition 12. A spring 57 is interposed between an abutment 58, carried by the bar, and a loose washer 59, resting against the partition 12, for normally holding the plunger at the limit of its outward movement. A curved guard 60 projects inwardly from the socket-piece 49 into a position just above the coin-chute 15, which curved guard partially surrounds the plunger. As the plunger is forced inwardly the curved guard 60 serves to support the coin within the space 54 until it is in position over the coin-chute, when the coin will be permitted to drop from the said space 54. A spring-actuated presser-plate 61 is located within a recess 62 in the inner wall of the socket-piece 49 adjacent to the periphery of the plunger, which presser-plate is held in position by springs 63. The bar 55 and the presser-plate 61 are provided with narrow slots 64 65 opposite the space 54 for a portion of the width of the space, so that a disk of greater diameter, but thinner than the predetermined coin, will pass entirely through the said space when inserted through the slot 51 in the socket-piece 49. A magnet 66 (shown herein of horseshoe form) is supported by a bracket 67 adjacent to the top of the plunger, so that as the plunger is forced inwardly the magnet will retain a disk of iron or steel of the predetermined size in position within the space and will not permit it to drop into the coin-chute 15.

The coin-controlled mechanism shown and described herein forms the subject-matter of a copending application filed by me July 1, 1903, Serial No. 163,899, and is therefore not claimed herein.

What I claim is—

1. In a vending-machine, a reservoir for the articles, a delivery-chute, an intermediate partition having an opening therein communicating with the reservoir and chute, a rotary delivery-wheel having measuring-pockets therein arranged to convey the articles from the reservoir to the opening in the partition and thereby to the delivery-chute, a casing for inclosing a portion of the delivery-wheel and a yielding guard hinged to the casing for preventing the articles from falling through the opening in the partition from the compartment in the wheel which is exposed to the reservoir.

2. In a vending-machine, a reservoir for the articles, a delivery-chute, an intermediate partition having an opening therethrough communicating with the chute and reservoir, a delivery-wheel having measuring-pockets therein for conveying the articles from the reservoir to the chute, a casing inclosing the portion of the wheel over the opening in the partition and a yielding plate depending from the casing in position to retain the articles to be vended within their compartment beneath the casing until the compartment has been brought into alinement with the opening in the partition.

3. In a vending-machine, a reservoir for the articles, a delivery-chute, an intermediate partition having an opening therethrough communicating with the chute and reservoir, a delivery-wheel having measuring-pockets therein for conveying the articles from the reservoir to the delivery-chute, a casing inclosing a portion of the wheel, a yielding guard at one side of the opening and an article-retaining plate at the other side of the opening for preventing the unintentional delivery of articles from the wheel into the delivery-chute.

4. In a vending-machine, a reservoir for the articles, a delivery-chute, an intermediate partition having an opening therethrough communicating with the chute and reservoir, a delivery-wheel having measuring-pockets therein for conveying the articles from the reservoir to the chute, a casing inclosing a portion of the wheel, a yielding guard, an article-retaining plate and a yielding article-dividing plate carried by the casing for insuring the accurate delivery of the articles from the reservoir to the chute.

In testimony that I claim the foregoing as my invention I have signed my name, in presence of two witnesses, this 25th day of June, 1903.

FRANK W. TUCKER.

Witnesses:
FREDK. HAYNES,
HENRY THIEME.